UNITED STATES PATENT OFFICE.

LOUIS D. MILLS, OF SAN FRANCISCO, CALIFORNIA, ASSIGNOR TO THE MERRILL COMPANY, OF SAN FRANCISCO, CALIFORNIA, A CORPORATION OF CALIFORNIA.

PROCESS OF EXTRACTING COPPER FROM ITS ORES.

1,360,666.  Specification of Letters Patent.  Patented Nov. 30, 1920.

No Drawing.  Application filed January 23, 1917. Serial No. 143,910.

*To all whom it may concern:*

Be it known that I, LOUIS D. MILLS, a citizen of the United States, and a resident of San Francisco, in the county of San Francisco and State of California, have invented certain new and useful Improvements in Processes of Extracting Copper from Its Ores, of which the following is a specification.

This invention relates to processes for extracting copper from ores and has for its object the rendering of such processes more efficient and economical by providing a new method of supplying and utilizing the iron necessary to precipitate the copper from the solution, by means of which it is dissolved from the ore.

By my invention, metallized iron ore without the separation of the metallic iron from all of the gangue or other matter present is used to precipitate copper in an ore pulp containing copper in solution. In order that my invention may clearly be understood, I will describe in detail processes embodying it.

In the embodiment of my invention which I shall first describe, the materials operated upon consist of (1) a copper ore containing some copper in soluble form, that is, in the form of oxid or carbonate, and (2) an ore containing an oxid or sulfid of iron, such as hematite or pyrite. If the iron ore contains any copper, this copper, as well as that contained in the copper ore, is recovered by means of my process. Gold or silver contained either in the iron ore or the copper ore is also recovered by my process.

In the preliminary steps of my process, the two ores are treated separately.

The copper ore is first crushed or ground to a suitable fineness by any of the well-known methods. This crushing may either be dry or with water or with water mixed with a copper solvent, such as sulfuric acid or sodium bisulfate. The finely ground ore is mixed and agitated by any suitable means with just sufficient copper solvent to accomplish the substantially complete solution of the soluble copper.

During the above described treatment of the copper ore, the iron ore is treated as follows:—It is first crushed or rolled to reduce it to fine particles. Then, if necessary, to eliminate any volatile substance, such as sulfur, the powdered ore is submitted to an oxidizing roast in any suitable furnace, as, for example, the Wedge furnace or the McDougal furnace. By this means, the volatile substance in the ore is almost completely eliminated and substantially all of the iron is converted into the oxid form. If no volatile substance is present in the ore, this step may be omitted. The crushed ore then undergoes a metallizing or reducing roast. This step is carried out by mixing the ore with a reducing agent, such as crushed coal or coke or charcoal, and placing the mixture in any type of continuous or intermittent furnace constructed to maintain reducing conditions, as, for example, a rotary furnace of the Brückner type. The furnace is preferably heated by an oil flame and admission of air to the furnace is limited, so that the heating results in a combination between the reducing agent and the oxygen of the iron oxids in the ore, which are thus reduced to metallic form. This reduction takes place at a temperature between 1600° and 2000° F. After the reduction has taken place, the product from the furnace, consisting of fine metallic iron sponge, together with some unreduced iron oxid and the gangue, is preferably quenched in water and immediately ground in a tube mill or other suitable mill. If the product from the furnace is not immediately quenched in water, it should be cooled with the exclusion of air to prevent reoxidation of the iron, and ground. The grinding of the product from the reduction furnace completes the separate treatment of the iron ore.

The finely divided product of the iron ore is then mixed and agitated with the copper ore pulp and copper solvent, which have already been mixed as before described. The metallized iron ore should preferably be added to the copper-containing solution immediately after the grinding of the metallized iron ore, in order that the metallic iron in it may not become oxidized before being used as a precipitant. The metallized iron ore is preferably not added until all or nearly all the soluble copper mineral contained in the copper ore has been dissolved by the copper solvent. The metallic iron contained in the iron ore displaces the dissolved copper from its solution and precipitates it in the mixture as metallic copper. At the same time, any copper contained in the iron ore, now in the form of soluble copper oxid, is dissolved by the copper solvent and immediately precipitated by the iron as metallic copper. After these reactions take place, therefore, the solid content of the mixture consists of particles of metallic copper and in some cases also of sulfids and metallic gold and silver, if any such were contained in either of the ores, and iron, and the gangue from the copper ore and the gangue from the iron ore.

The next step is to separate the metallic particles and any sulfid particles present from the gangue. This may be accomplished by flotation with pine-tar oil in any apparatus heretofore used for oil flotation, or by some other suitable form of flotation concentration. The concentrate from the flotation cell, which consists of metallic copper and iron, and sometimes sulfids and gold and silver contained in the ores, is then smelted in the usual manner.

Many changes may be made in the specific procedure described without departing from my invention. In some cases, for example, it is desirable to carry out the grinding of the copper ore and of the reduced or metallized iron ore simultaneously in the same machine. This grinding may, if desired, be done in the presence of the copper solvent or the copper solvent may subsequently be added to the combined ore pulp.

If preferred, iron ore concentrate may be used in my process instead of iron ore. In such concentrate, the ratio of the iron oxid to foreign matter is, of course, greater than that in the ore, but it should be noted that iron concentrate is not pure iron oxid, but always carries an appreciable proportion of gangue. The use of concentrate instead of iron ore in my process merely involves separating out a portion of the gangue before reducing the iron oxid in the ore instead of separating out all the gangue of the iron ore after precipitation. The precise proportion of iron ore gangue present during the metallizing and precipitation is, of course, immaterial, but an important advantage of my process is that it makes it unnecessary to separate the gangue contained in the iron concentrate or the iron ore used from the iron present before use of this iron as a precipitant.

I have now described some embodiments of my invention in detail, in order to make plain the nature of the invention. I wish it clearly understood, however, that my invention is by no means limited to the specific embodiments of it which have been described.

What I claim is:—

1. In the process of extracting copper from its ore the step of using finely divided freshly reduced iron as a means for precipitating copper from its solution.

2. In the process of extracting copper from its ore the step of using finely divided metallized iron ore as a means for precipitating the copper from its solution.

3. In extracting copper from its ores, the process of adding finely divided metallized iron ore to an ore pulp containing copper in solution; and then separating the precipitated metallic copper from the gangue.

4. In extracting copper from its ores, the process of adding finedly divided metallized iron ore to an ore pulp containing copper in solution; and then separating the precipitated metallic copper from the gangue by flotation concentration.

5. In extracting copper from its ores, the process of adding finely divided metallized iron ore to an ore pulp containing copper in solution; and then separating the precipitated metallic copper and other metals and sulfids present from the gangue by flotation concentration.

6. In extracting copper from its ores, the process of adding a finely divided mass containing freshly reduced iron and gangue to a copper-bearing solution; and then separating the precipitated metallic copper from said gangue by flotation concentration.

7. In extracting copper from its ores, the process consisting of adding finely divided metallized iron ore to a copper-bearing solution; and then separating the precipitated metallic copper from the gangue of the iron ore by flotation concentration.

8. A metallurgical process comprising subjecting iron oxid to a reducing roast; quenching the reduced material with water; and immediately grinding it and mixing it with a copper-bearing solution.

9. A metallurgical process comprising subjecting material containing iron oxid and other matter to a reducing roast; quenching the resulting material with water; and immediately grinding it and mixing it with a copper-bearing solution.

10. A metallurgical process comprising subjecting material containing iron oxid and other matter to a reducing roast; quenching the resulting material with water; and immediately grinding it and mixing it with an ore pulp containing copper in solution.

11. A metallurgical process comprising subjecting iron oxid to a reducing roast; and immediately after reduction grinding it and mixing it with a copper-bearing solution.

12. In extracting copper from its ores, the process of subjecting iron ore to a reducing roast; quenching the resulting material with water; immediately grinding it and mixing it with a copper-bearing solution; and separating the precipitated copper from the gangue of the iron ore by flotation concentration.

13. A metallurgical process comprising mixing a mass of material containing soluble copper mineral, freshly reduced iron, gangue and a copper solvent; and separating the precipitated metallic copper from the gangue.

14. A metallurgical process comprising mixing a mass of material containing soluble copper mineral, freshly reduced iron, gangue and a copper solvent; and separating the precipitated metallic copper from the gangue by flotation concentration.

15. A metallurgical process comprising subjecting an ore containing copper and iron oxid to a reducing roast; mixing the resulting product with a copper solvent whereby the copper in the ore is dissolved by the solvent and precipitated by the metallic iron; and separating the precipitated copper from the gangue of the ore.

16. A metallurgical process comprising subjecting an ore containing copper and iron oxid to a reducing roast; mixing the resulting product with a copper solvent whereby the copper in the ore is dissolved by the solvent and precipitated by the metallic iron; and separating the precipitated copper from the gangue of the ore by flotation concentration.

LOUIS D. MILLS.